(12) United States Patent
Echavarri et al.

(10) Patent No.: US 7,301,918 B2
(45) Date of Patent: Nov. 27, 2007

(54) FIXED CELLULAR TERMINAL WITH PACKET DATA TRANSMISSION OVER ANALOG INTERFACE

(75) Inventors: Ana Echavarri, Getxo (ES); Rosa Laforga, Barakaldo (ES); Ana-Maria Nunez-Guiloche, Bilbao (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1008 days.

(21) Appl. No.: 10/124,723

(22) Filed: Apr. 18, 2002

(65) Prior Publication Data

US 2003/0198198 A1    Oct. 23, 2003

(51) Int. Cl.
*H04Q 7/00* (2006.01)
*H04Q 7/24* (2006.01)
*H04L 12/66* (2006.01)
*H04L 12/28* (2006.01)
*H04L 12/56* (2006.01)

(52) U.S. Cl. .................. 370/328; 370/338; 370/463; 370/401; 370/352

(58) Field of Classification Search ................ 370/328
See application file for complete search history.

(56) References Cited

U.S. PATENT DOCUMENTS 5,625,870 A * 4/1997 Moon ..................... 455/411

(Continued)

OTHER PUBLICATIONS

Haartsen, Jaap, "Bluetooth—The Universal Radio Interface For Ad Hoc Wireless Connectivity", *Ericsson Review*, No. 3, 1998, pp. 110-117.

(Continued)

*Primary Examiner*—Edan Orgad
*Assistant Examiner*—Blanche Wong
(74) *Attorney, Agent, or Firm*—Nixon & Vanderhye, P.C.

(57) ABSTRACT

A fixed cellular terminal (FCT) (30) includes a packet-service unit (154), an analog line interface (120), and a packet-service/analog line gateway (68). The packet-service unit facilitates radio frequency communication over an air interface with a cellular telecommunications network and provides, amongst others, a packet-service such as GPRS service. The analog line interface is connected to a modem in a terminal equipment unit (50). The packet-service/analog-line gateway (68) enables use of the packet-switched service on the analog line interface (120) and implements a layer 2 point-to-point protocol over the layer 1 analog modulations in a FCT modem (121), thereby providing the FCT with the protocol that the terminal equipment (TB) normally requires on the remote side of a circuit-switched connection. Also, the packet-service/analog-line gateway includes a sequence interpreter (150) which recognizes predetermined gateway-controlling sequences on the analog line (46). In one example mode of the invention, the sequence interpreter recognizes a predetermined sequence of digits generated by a terminal equipment unit as a start packet-switched service command. Upon receipt of a start packet-switched service command the packet-service/analog line gateway coordinates actions on both the packet-service unit (e.g., performing a packet-service attach procedure; activating PDP contexts) and the analog line (starting a point-to-point connection). The packet-switched TCP socket can then be transparently transported over these layers, to and from the TE and the network. In another mode of the invention, the sequence interpreter recognizes another predetermined sequence of digits generated by a terminal equipment unit as an automatic packet-service attach command which results in automatic performance of a packet-service attach procedure upon powering on of the fixed cellular terminal (FCT).

33 Claims, 5 Drawing Sheets

U.S. PATENT DOCUMENTS

| | | | |
|---|---|---|---|
| 5,777,991 A * | 7/1998 | Adachi et al. | 370/352 |
| 5,930,727 A * | 7/1999 | Henry, Jr. | 455/557 |
| 5,991,641 A | 11/1999 | Goni et al. | |
| 6,094,444 A | 7/2000 | Auer | |
| 6,122,263 A | 9/2000 | Dahlin et al. | |
| 6,169,883 B1 | 1/2001 | Vimpari et al. | |
| 6,195,531 B1 | 2/2001 | Aguirre et al. | |
| 6,240,277 B1 * | 5/2001 | Bright | 455/74.1 |
| 6,349,199 B1 * | 2/2002 | Armantrout | 455/67.11 |
| 6,603,984 B2 * | 8/2003 | Kanefsky | 455/566 |
| 2002/0070932 A1 * | 6/2002 | Kim | 345/419 |
| 2002/0085512 A1 * | 7/2002 | Lehtimaki et al. | 370/328 |
| 2002/0114439 A1 * | 8/2002 | Dunlap | 379/219 |
| 2003/0117948 A1 * | 6/2003 | Ton et al. | 370/218 |
| 2004/0054794 A1 * | 3/2004 | Lantto et al. | 709/229 |
| 2004/0132447 A1 * | 7/2004 | Hirschfeld et al. | 455/426.2 |
| 2005/0046613 A1 * | 3/2005 | Ruutu et al. | 342/357.1 |

OTHER PUBLICATIONS

European Search Report mailed Jan. 27, 2003.

International Search Report mailed Jun. 13, 2003 in the corresponding PCT application PCT/SE03/00570.

* cited by examiner

FIXED CELLULAR TERMINAL WITH PACKET DATA TRANSMISSION OVER ANALOG INTERFACE

BACKGROUND

I. Field of the Invention

The present invention pertains to fixed wireless telecommunications, and particularly to packet data transmission using a fixed cellular terminal (FCT).

II. Related Art and Other Considerations

Fixed wireless is the use of wireless technology to provide voice, data, or video service to fixed locations. There are several fixed wireless systems that can replace or bypass services that have traditionally been provided by copper wire or fiber cable. Wired systems that may be replaced or bypassed include wired telephone service, high speed telephone communication links, cable television systems, and local area network systems.

The basic fixed wireless technologies that are being introduced include wireless local loop (WLL), wireless cable, wireless bypass, and wireless local area networks (WLAN). These fixed wireless services can provide local dial tone voice service, high speed data, and video service. In some cases, a single fixed wireless system may provide all these services at the same time.

In one of its forms, wireless local loop (WLL) refers to distribution of telephone service, e.g., from the nearest telephone central office, over a wireless link to a fixed wireless terminal (FWT), also termed a fixed cellular terminal (FCT). One or more subscribers are connected to the fixed cellular terminal (FCT). Thus, such a wireless local loop system connects subscribers to the public switched telephone network (PSTN) using radio signals as a substitute for copper between, e.g., the fixed cellular terminal (FCT) and the switch.

Traditionally, the fixed cellular terminal (FCT) takes the form of a box with an antenna (or cable to an external antenna), power input, and connections for POTS phones, faxes, and data devices such as personal computers. The most basic service offered by wireless local loop (WLL) systems is to provide standard dial tone service known as plain old telephone service (POTS). Nowadays, in addition to the basic services, WLL systems typically offer advanced features such as high-speed data, residential area cordless service, and (in some cases) video services. More recently the sizes of such boxes have been reduced to about the size of a videocassette, including battery backup. The enclosures can be placed on a desktop or mounted on a wall. Ordinary telephone equipment, including POTS phones and Group III fax machines, can be connected via RJ-11 ports. Typically up to five devices can be connected in parallel (5 REN). When the subscriber picks up the phone, a dial tone is present and the telephone operates just as if it were connected to the landline PSTN.

Examples of fixed cellular terminals (FCT) are provided, e.g., in U.S. Pat. No. 5,991,641; U.S. Pat. No. 6,195,531; and U.S. Pat. No. 6,122,263; all of which are incorporated herein by reference.

Thus, fixed cellular terminals (FCT) provide PSTN-like services to all kinds of existing devices that can currently be connected to a normal fixed line. The fixed cellular terminal (FCT) can be connected to these devices by using a wired connection (e.g., two-wire connection, RS 232, etc.) or a wireless connection.

GSM (Global System for Mobile communications) is a European standard for a second generation wireless network which essentially serves as a wireless counterpart of the Integrated Services Digital Network (ISDN) system. GSM fixed cellular terminals provide an interface between a GSM radio and a fixed analog telephone line. Additional features, such as one or more digital data interfaces have been added. Examples of these digital data interfaces include RS232 and Bluetooth. Bluetooth is a universal radio interface operating within the ISM band. The Bluetooth standard is a low-cost short range wireless connection which uses much of the same range of frequencies for its frequency-hopping spread spectrum transmissions as the IEEE 802.11 standard (see www.bluetooth.com and Haartsen, Jaap, "Bluetooth—The Universal Radio Interface For Ad Hoc Wireless Connectivity", *Ericsson Review*, No. 3, 1998).

In terms of data communications, single-timeslot or multi-timeslot GSM data channels were set up in the air interface. These data channels were implemented as circuit-switched data channels (CSD). These GSM data channels were connected either to the digital data interface or the analog line interface of the fixed cellular terminal. In the case of connection to the analog line interface, ITU-T V-series modulations were employed.

The advent of GPRS (General Packet Radio Services) ushered in a new feature to fixed cellular terminals: packet-switched communication over the digital data interfaces of the fixed cellular terminal. The digital data interfaces of the fixed cellular terminal are equally suitable for circuit-switched and packet-switched communications. Packet-switched communications have manifest advantages, including but not limited to efficiency and relatively low cost.

Despite the availability of the digital data interfaces for packet-switched communications, the most important interface provided by a fixed cellular terminal is the GSM radio/analog line interface. The GSM radio/analog line interface is utilized for speech, fax, and data communications. Indeed, the analog line is the most extensively used and more popular among users. Although the fixed cellular terminal is capable of using both circuit-switched (CSD, HSCSD) and packet-switched (GPRS) data, if the user wants to communicate over the analog interface of the fixed cellular terminal, heretofore only a circuit-switched connection could be established. Required utilization of a circuit-switched connection is unfortunate in due of the advantages of packet-switched communications.

In the above regard, the analog interface expects that a connection will be established by dialing a B-number to establish a circuit-switched connection with a B-party. But B-numbers and the like are not encompassed nor anticipated by most packet-switched protocols, such as TCP/IP, for example.

What is needed, therefore, and an object of the present invention, is utilization of a packet-switched service over a regular analog line modem connection of a fixed cellular terminal.

BRIEF SUMMARY

A fixed cellular terminal (FCT) comprises a packet-service/analog-line gateway that enables the use of a packet-switched service on an analog line interface. The analog line interface is connected to a radio unit (which facilitates radio frequency communication over an air interface with a cellular telecommunications network) and to a modem in a terminal equipment unit. The packet-service/analog-line gateway implements a layer 2 point-to-point protocol that builds a link for packet transportation. The implementation of this layer 2 protocol allows the FCT to provide packet-switched connections through the analog interface without requiring any changes in the terminal equipment unit (TE) configuration (which is regularly circuit-switched connected to the cellular network).

The packet-service/analog-line gateway includes an analog line handler which is in charge of managing the analog line interface functions (off/on-hook, DTMF & pulse detection, tone generation, complete modem management, etc.). In addition, the packet-service/analog-line gateway includes a control unit which controls all gateway functions, i.e. implements a point-to-point protocol on the analog line interface (simulating circuit-switched connection), runs the packet encapsulating/de-encapsulating, produces packet-switched function control commands for the radio unit based on the analog line sequence interpreter results, and controls a sequence interpreter and the analog line handler.

In one mode of the invention, the sequence interpreter of the packet-service/analog-line gateway recognizes a predetermined sequence of digits generated by a terminal equipment unit as a start packet-switched service command. Upon receipt of a start packet-switched service command the packet-service/analog-line gateway performs the steps of: performing a packet-service attach procedure; and, activating PDP contexts. In another mode of the invention, the sequence interpreter recognizes another predetermined sequence of digits generated by a terminal equipment unit as an automatic packet-service attach command, which results in automatic performance of a packet-service attach procedure upon powering on of the fixed cellular terminal (FCT).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 5 illustrates an automatic mode of the invention wherein a fixed cellular terminal (FCT) 30 automatically attaches itself to a packet-switched network when the fixed cellular terminal (FCT) is powered on.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
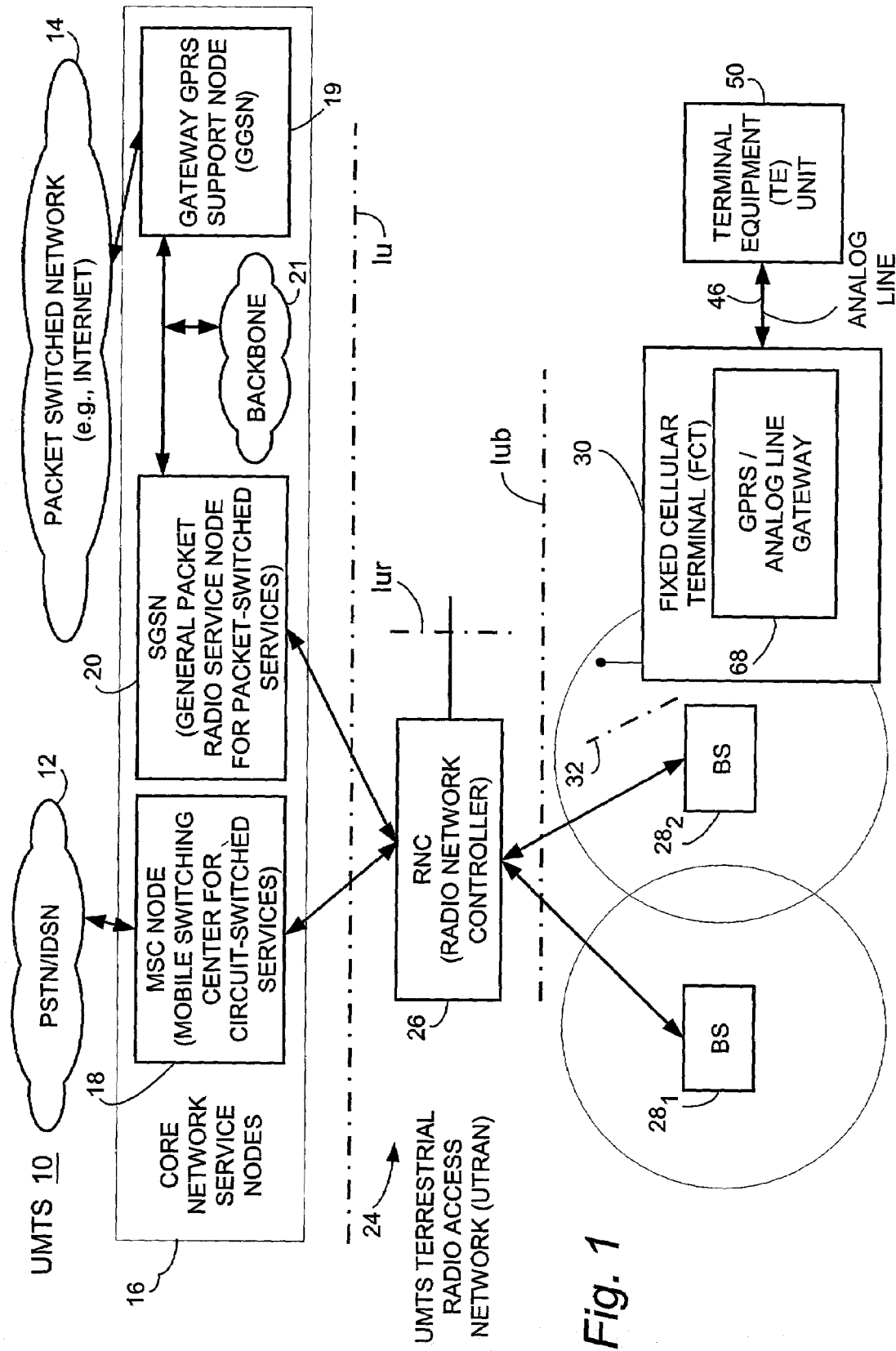
FIG. 1 is diagrammatic view of an example mobile communications system in which a fixed cellular terminal (FCT) of the present invention may be advantageously employed.

The present invention is described in the non-limiting, example context of a universal mobile telecommunications (UMTS) 10 shown in FIG. 1. A representative, connection-oriented, external core network, shown as a cloud 12 may be for example the Public Switched Telephone Network (PSTN) and/or the Integrated Services Digital Network (ISDN). A representative, connectionless external core network shown as a cloud 14, may be for example the Internet. Both core networks are coupled to their corresponding service nodes 16. The PSTN/ISDN connection-oriented network 12 is connected to a connection-oriented service node shown as a Mobile Switching Center (MSC) node 18 that provides circuit-switched services. In the illustrated examples which (for sake of example) particularly employ the General Packet Radio Service (GPRS), the Internet connectionless-oriented network 14 is connected through a Gateway General Packet Radio Service (GPRS) support node (GGSN) 19 to a Serving General Packet Radio Service (GPRS) Support Node (SGSN) node 20, the latter being tailored to provide packet-switched type services gateway GRPS support node (GGSN) 19 provides the interface towards the packet-switched network (e.g., the Internet, X.25 external networks) represented by cloud 14. Gateway GRPS support node (GGSN) 19 translates data formats, signaling protocols and address information in order to permit communication between the different networks. Serving GPRS Support Node (SGSN) 20 provides packet routing to and from a SGSN service area, and serves GPRS subscribers which are physically located within the SGSN service area. Serving GPRS Support Node (SGSN) 20 provides functions such as authentication, ciphering, mobility management, charging data, and logical link management toward the user equipment unit. A GPRS subscriber may be served by any SGSN in the network depending on location. The functionality of Serving GPRS Support Node (SGSN) 20 and Gateway GRPS support node (GGSN) 19 may be combined in the same node, or may exist in separate nodes as shown in FIG. 1. Backbone network 21 provides connection between different GSN nodes and other components of the core network, and can be, e.g., an Internet Protocol (IP) network.

Each of the core network service nodes 18 and 20 connects to a radio access network (RAN) 24 over a radio access network interface. In GSM, the radio access network interface is referred to as the A interface. In another radio access network known as the UMTS Terrestrial Radio Access Network (UTRAN), the interface is referred to as the Iu interface. The radio access network 24 includes one or more nodes which function as base station control nodes. In GSM such control nodes are known as base station controllers (BSC), while in UTRAN such nodes are denominated as radio network controllers (RNCs). For sake of brevity, hereinafter the UTRAN model of radio access network will be presented by way of example, it being understood that principles of the present invention and the fixed cellular terminal (FCT) in particularly are equally applicable to other suitable radio access networks.

For sake of simplicity, the radio access network 24 of FIG. 1 is shown with only one RNC 26$_1$. Each RNC 26 is connected to a plurality of base stations (BS) 28. For example, and again for sake of simplicity, two base station nodes are shown connected to RNC 26. In this regard, RNC 26 serves base station 28$_1$ and base station 28$_2$. It will be appreciated that a different number of base stations can be served by each RNC, and that RNCs need not serve the same number of base stations. Moreover, FIG. 1 shows that an RNC can be connected over an Iur interface to one or more other RNCs in the URAN 24. Further, those skilled in the art will also appreciate that a base station is sometimes also referred to in the art as a radio base station, a node B, or B-node.

In the illustrated embodiments, for sake of simplicity each base station 28 is shown as serving one cell C. Each cell C is represented by a circle that surrounds the respective base station. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers.

A fixed cellular terminal (FCT), such as fixed cellular terminal (FCT) 30 shown in FIG. 1, communicates with one or more cells or one or more base stations (BS) 28 over a radio or air interface 32. Of course, the fixed cellular terminal (FCT) 30 is not shown to scale in FIG. 1, but rather for sake of illustrating various exemplary details is shown as extending even outside of the cell C$_2$ in which fixed cellular terminal (FCT) 30 is served. Each of the radio interface 32, the Iu interface, the Iub interface, and the Iur interface are shown by dash-dotted lines in FIG. 1.

Radio access in the radio access network 24 may be accomplished in a variety of ways. For example, radio access can be based upon Wideband Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality.

Advantageously, and in contrast to the prior art, in one aspect of the invention the fixed cellular terminal (FCT) 30 includes a packet service/analog-line gateway 68 that enables the use of a packet-switched service on an analog line interface of the fixed cellular terminal (FCT) 30. The analog line interface connects over an analog link 46 to a modem in a terminal equipment (TE) unit 50. It should be understood that, while not so illustrated, the fixed cellular terminal (FCT) 30 can also be connected to other terminal equipment (TE) units, and even other types of terminal equipment (TE) units over appropriate communication links.

Figure 2:
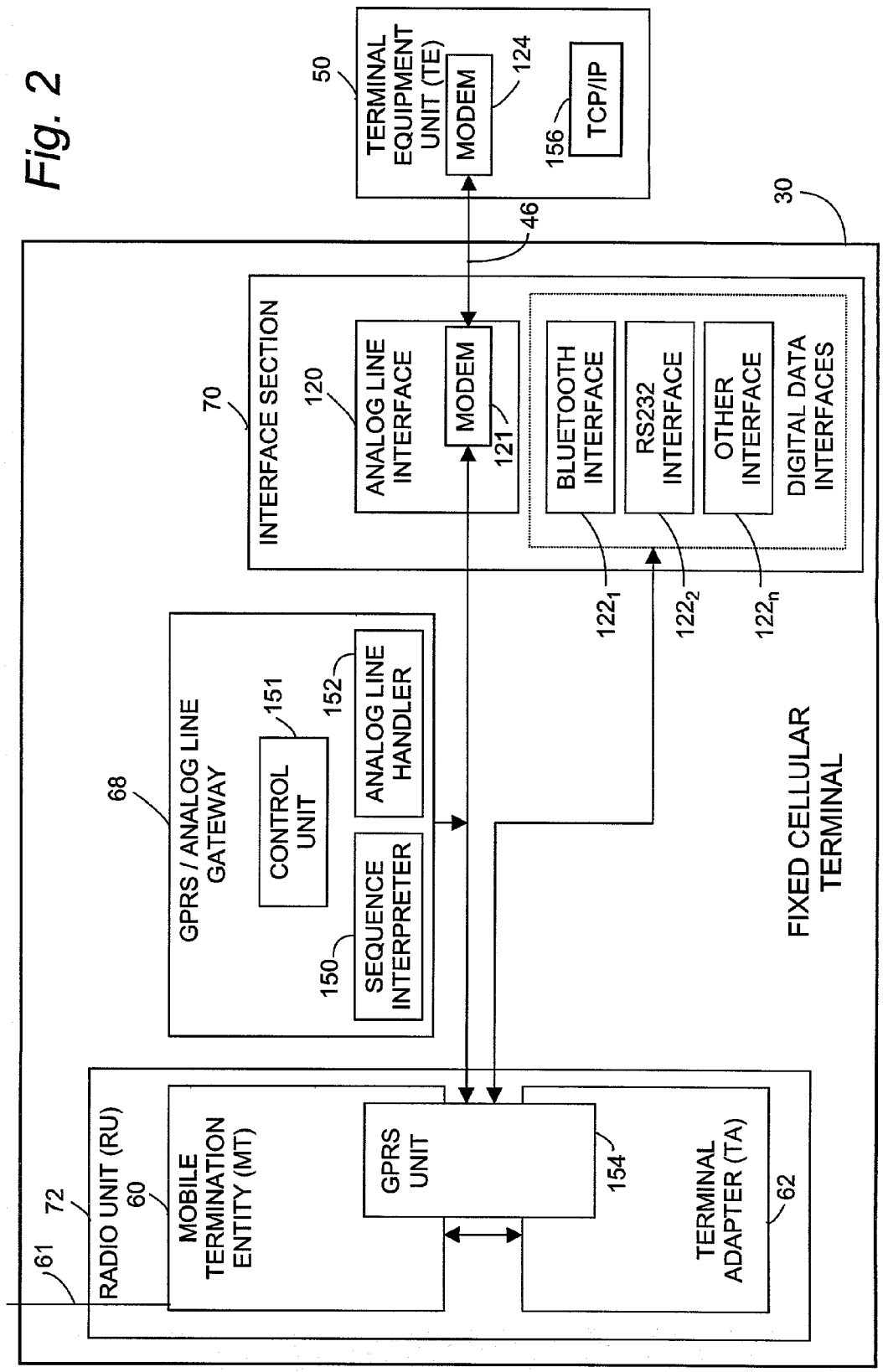
FIG. 2 is a schematic view of certain components of an example, non-limiting embodiment of a fixed cellular terminal (FCT) of the present invention, the fixed cellular terminal (FCT) being connected to a terminal equipment unit through an analog modem connection.

Further details of an example, non-limiting embodiment of a fixed cellular terminal (FCT) 30 according to the present invention are illustrated in FIG. 2. In particular, fixed cellular terminal (FCT) 30 is shown as comprising mobile termination entity (MT) 60; terminal adapter (TA) 62; packet service/analog-line interface 68; and interface section 70. While various ones of these entities are described below, it should be understood that the invention is not confined to fixed cellular terminals having the same physical separation between functional entities, and that the present invention can be implemented in other than the described functional configuration.

Mobile termination entity (MT) 60, sometimes referred to as the Mobile Equipment (ME), includes a radio transmitter/receiver (with antenna 61) and communications control toward the network, e.g., the setup and release of radio connections, handover, etc. Terminal adapter (TA) 62 acts as an adaptation between mobile termination entity (MT) 60 and various applications.

Mobile termination entity (MT) 60 and terminal adapter (TA) 62 are part of a radio unit (RU) 72, sometimes also known as a radio terminal (RCP). The radio unit (RU) 72 provides all the radio frequency communications functionality typically found in a mobile station for a cellular telephone system, including a tunable radio frequency transceiver for accessing the radio frequency carriers (and the digital cellular system TDMA or CDMA time slots therein, if applicable) for control channels and voice channels provided with the air interface 32. Collectively mobile termination entity (MT) 60 and terminal adapter (TA) 62 comprise a packet service unit 154, such as the GPRS unit which provides the GPRS service in the radio unit (RU) 72.

The interface section 70 has at least one analog line interface unit (LIU) 120. The line interface unit (LIU) 120 is provided with an analog modem 121. The analog modem 121 is connected by analog link 46 to modem 124 in terminal equipment (TE) unit 50.

In addition, interface section 70 optionally has one or more digital data interfaces 122. Examples of the digital data interfaces 122 include Bluetooth interface 122$_1$ and RS232 interface 122$_2$. Other types of digital interfaces can also be provided (IrDA, USB, etc.), as indicated by the open ended notation for interface 122$_n$. Other than the analog line interface 120, it should be understood that the present invention does not require any particular number or types of interfaces, and particularly that none of the digital interfaces shown in FIG. 2 is necessarily required for implementation of the present invention.

Among other functions, the packet service/analog-line gateway 68 manages the operation of the packet-service unit 154 (in the radio unit (RU) 72) and the interface section 70 to provide, e.g., the signal conversions required to establish and terminate calls to and from the interfaces through the wireless network.

As shown in FIG. 2, the packet service /analog-line gateway 68 includes various functionalities such as sequence interpreter 150; control unit 151; and analog line handler 152;. After a brief discussion of the protocol stacks utilized by the fixed cellular terminal (FCT) of FIG. 2, the roles played by each of these functionalities are explained in conjunction with ensuing example scenarios described with reference to FIG. 4 and FIG. 5.

Figure 3:
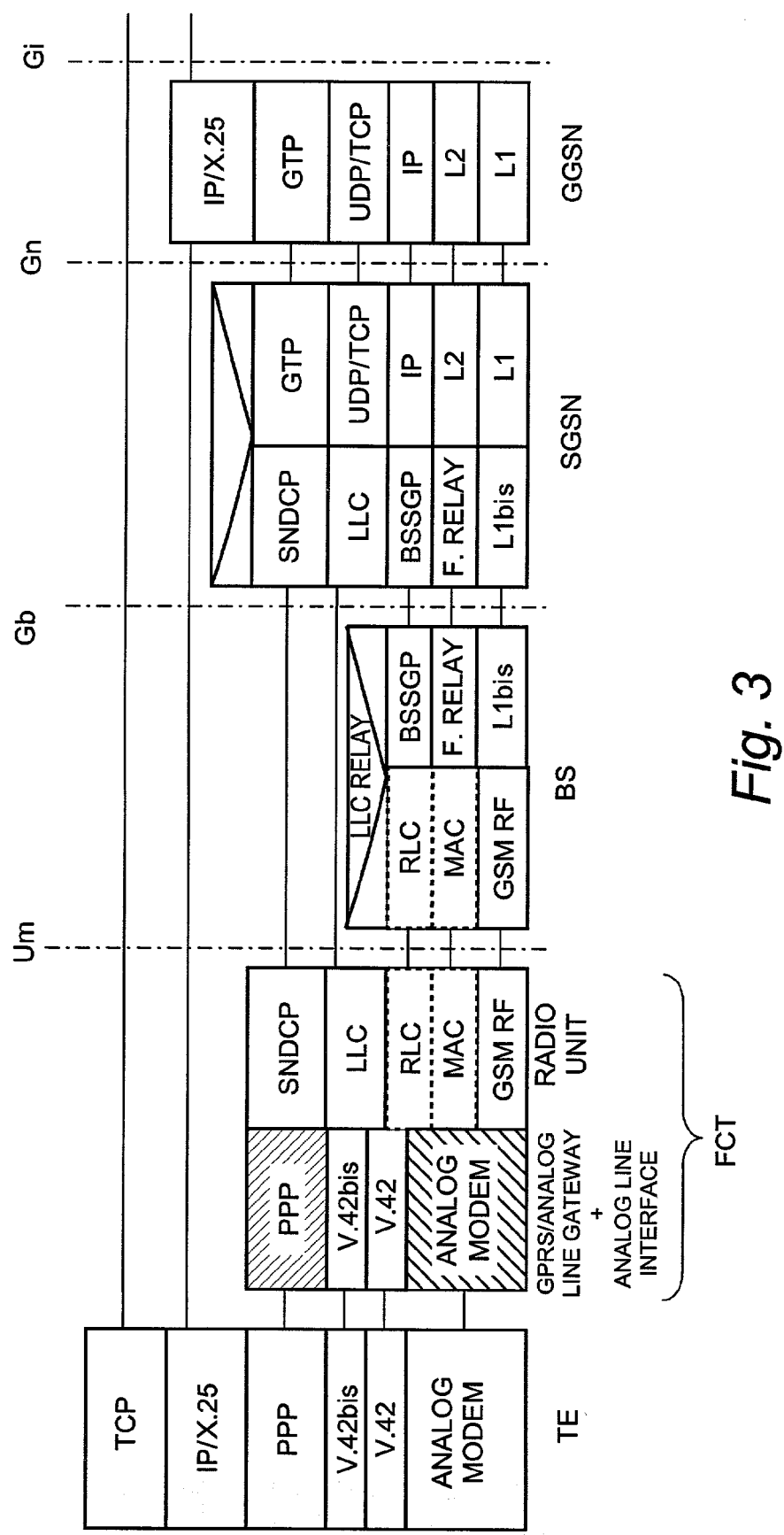
FIG. 3 is a diagrammatic view showing an example protocol stack utilized by the fixed cellular terminal (FCT) of FIG. 2.

FIG. 3 shows the protocol stacks utilized in conjunction with the operation of the example fixed cellular terminal (FCT) 30 of FIG. 2. Blocks which are lined (e.g., crosshatched) illustrate which particular protocols in the FIG. 3 protocol stacks of the present invention differ from the protocol stacks conventionally employed by fixed cellular terminals for circuit-switched services on the analog line interface. As ascertained from FIG. 3 and FIG. 2, the analog line interface 120 of fixed cellular terminal (FCT) 30 has its analog modem 121 at the physical layer, which connects by analog link 46 to modem 124 in terminal equipment (TE) unit 50. Successive higher layers in the protocol stacks for the analog line interface 120 of fixed cellular terminal (FCT) 30 and terminal equipment (TE) unit 50 are the V.42 layer, the V.42bis layer, and a point-to-point (PPP) layer.

The V.42 and V.42bis layers in FIG. 3 are present in both circuit-switched and packet-switched transmissions on the analog line interface. The V.42 layer is an error-detection and error-correction protocol for use with V-Series duplex data circuit-terminating equipment (DCEs), that allows accepting start-stop data from the data terminal equipment (DTE) and transmitting in synchronous mode. The V.42bis layer is a data compression procedure for use with V-series data circuit-terminating equipment (DCEs), able also to work in a transparent mode when necessary.

The Point-to-Point Protocol (PPP) is used to configure and maintain a link suitable for transport of network layer protocol packets over a serial link. Typically, it connects a personal computer connected by phone line to a server. In the circuit-switched connection illustrated in FIG. 1, which connects the terminal equipment (TE) 50 under the FCT analog interface 120 to an Internet Service Provider (ISP) in the PSTN/ISDN network 12, this PPP layer is present in both the ISP and the terminal equipment (TE) 50.

For the FCT to provide packet-switched connection through the analog interface without requiring any changes in the terminal equipment unit (TE) 50 configuration, the PPP layer should be present. This layer however is not available in a packet-service network nodes such as the GPRS network SGSN 20 and GGSN 19 nodes, as the GPRS network utilizes its own layer 2 protocols. Thus, unlike prior art FCTs, embodiments of the FCTs described herein have a packet-service/analog-line gateway, and such packet-service/analog-line gateway includes the Point-to-Point Protocol (PPP). As explained above, inclusion of the Point-to-Point Protocol empowers the packet-service/analog-line gateway 68 of the FCT to build a link for IP packet transportation, and make the terminal equipment (TE) 50 believe it is circuit-switched connected to a server or ISP, sending IP packets over a regular PPP layer. The control unit 151 in the FCT, when passing the IP packets to/from a packet-service unit such as the GPRS unit 154, switches from one layer 2 protocol (PPP) to another (e.g., GPRS-specific).

Some parameters negotiated on the local layer 2 protocol (PPP) can be passed on to the network layer 2 protocol, and vice versa. For example, authentication parameters such as the GPRS user ID and password are entered by the end-user and transferred in the PPP layer between the terminal equipment (TE) 50 and the packet service/analog-line gateway 68. However, these parameters are used in the real authentication process, in GPRS network layer 2.

Figure 4:
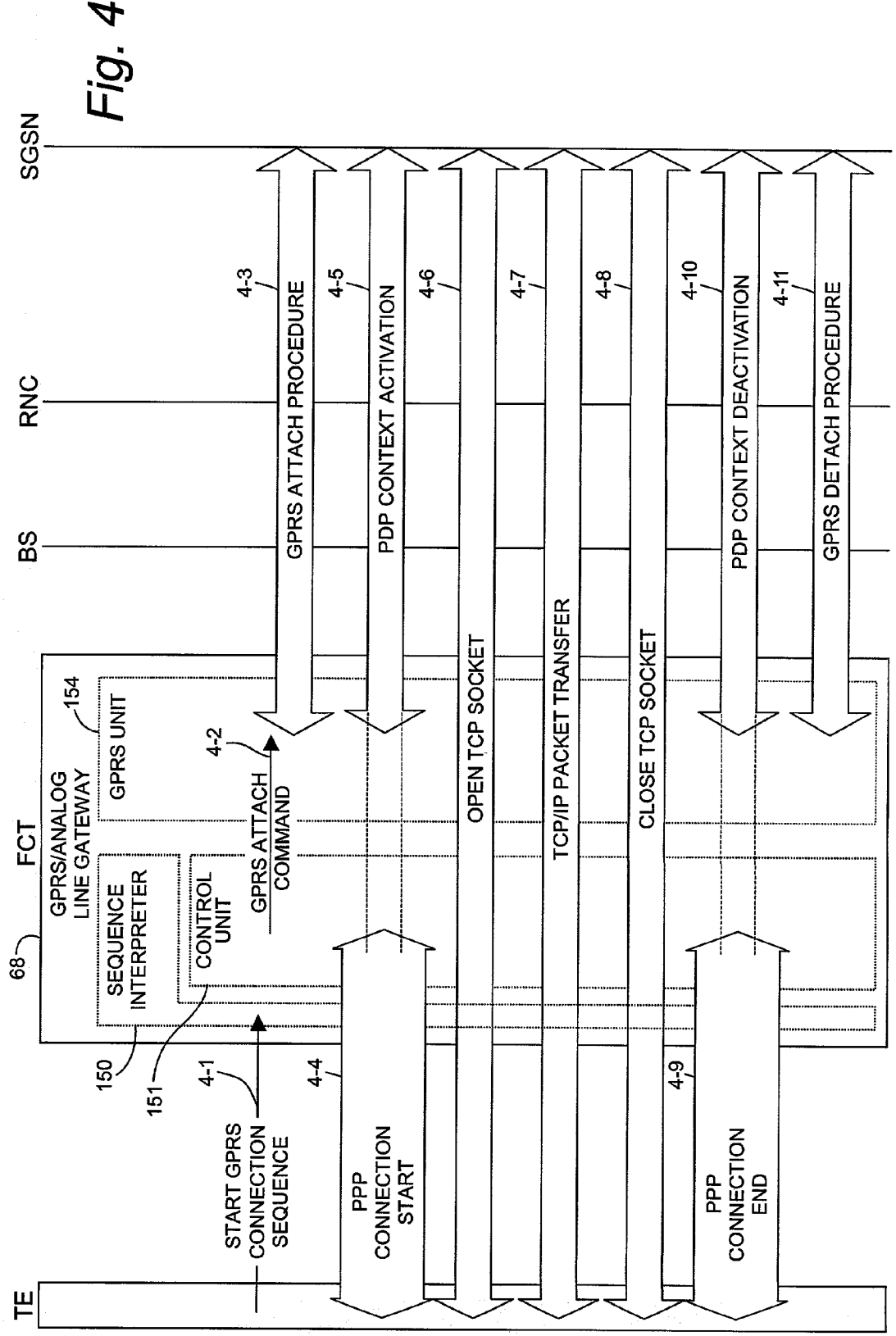
FIG. 4 is a diagrammatic view showing basic events involved in commencing and terminating a packet service connection over an analog line interface of the fixed cellular terminal (FCT) of FIG. 2, with the FCT working in an attach-on-calls mode.

FIG. 4 shows an example scenario showing certain representative, basic steps or events of operation of fixed cellular terminal (FCT) 30 wherein a packet service is utilized at the fixed cellular terminal (FCT) 30 in conjunction with the analog line interface 120 of fixed cellular terminal (FCT) 30. Whereas in traditional circuit-switched connections the terminal equipment (TE) would dial the B-number of the TCP/IP service provider (e.g., an Internet Service Provider), in accordance with one mode of the present invention the terminal equipment (TE) unit 50 instead dials a predetermined sequence of digits as a start packet-switched service command. Transmission of an example such start packet-switched service command over the analog link 46 to fixed cellular terminal (FCT) 30 is illustrated as event 4-1 in FIG. 4. The sequence interpreter 150 of fixed cellular terminal (FCT) 30 recognizes the predetermined sequence of digits that serve as the start packet-switched service command. The start packet-switched service command is not sent to the network, but instead initiates a sequence of actions including subsequent actions shown in FIG. 4.

FIG. 4 illustrates one example mode of the invention. Upon recognition by sequence interpreter 150 that the start packet-switched service command has been received, the control unit 151 commands the packet-service unit 154 to perform a packet-service attach procedure, action 4-2 in FIG. 4. In essence, the packet-service attach procedure creates a logical link between a node such as the SGSN node 20 (see FIG. 1) and the fixed cellular terminal (FCT) 30. The SGSN node 20 keeps track, e.g., of which base station 28 to use when sending packets to the fixed cellular terminal (FCT) 30 which arrive from outside networks. In FIG. 4, the packet-service attach procedure is represented by action 4-3.

Those skilled in the art will appreciate what is involved in the packet-service attach procedure 4-3. For example, when the packet-service is GPRS, for the GPRS attach procedure 4-3 the fixed cellular terminal (FCT) 30 sends an attach request message to SGSN 20. The SGSN 20 then checks to determine whether the SGSN knows the fixed cellular terminal (FCT) 30 and tries to find its unique IMSI identification number. Since the fixed cellular terminal (FCT) 30 is fixed, the SGSN 20 likely does know the IMSI, and therefore need not contact an old SGSN for the IMSI and authentication triples. Further, as part of the GPRS attach procedure 4-3, the SGSN 20 performs authentication of the fixed cellular terminal (FCT) 30 and tells the fixed cellular terminal (FCT) 30 about its assigned Temporary Location Link Identifier (TLLI). The Temporary Location Link Identifier (TLLI) is used through the GPRS session as an identifier for the logical link between the SGSN 20 and the fixed cellular terminal (FCT) 30.

Action 4-4 of FIG. 4 shows the FCT control unit 151 and the terminal equipment unit (TE) 50 activating or starting the PPP connection. This process embraces the PDP context activation process 4-5 between the GPRS unit 154 and the network. In other words, the PPP layer activation triggers the PDP context activation, and does not end until its completion. The PPP layer activation allows exchange of the necessary layer 2 information between the analog line layer 2 negotiation and the air-interface layer 2 negotiation. The establishment of the layer 2 connections (network with GPRS unit 154; control unit 151 with terminal equipment (TE) unit 50) allows the transparent opening of sockets and transfer of layer 3 and above information (TCP/IP packets, etc.) between the application in the terminal unit and the corresponding node in the packet-switched cellular network Action 4-5 of FIG. 4 shows packet-service unit 154 activating PDP (Packet Data Protocol) contexts for the connection. When a PDP context is activated, a dynamic binding between the GSM/packet-service (e.g., GPRS) identity of the FCT and the external data network user-ID and/or address is made by the system, and the appropriate service parameters are applied thus establishing a virtual connection between the FCT and the packet-service network. The PDP context is therefore an interworking profile that holds certain parameters that are relevant to the connection. For instance, the PDP context includes the protocols that are used (e.g., IP or X25), the IP address (if IP is used), the quality of service (QoS) profile, information indicating whether compression is utilized, etc. The desired PDP context parameters can be set, for example, by the terminal equipment (TE) 50 application using attention commands (AT commands), by specific sequences decoded by the sequence interpreter 150, by a specific FCT-configuration PC application with specific communication protocols, etc.

Those skilled in the art will also appreciate what is involved in the PDP context activation procedure 4-5. As part of the PDP context activation procedure 4-5, the fixed cellular terminal (FCT) 30 sends a PDP context request message to SGSN 20, thereby enabling execution of security functions between fixed cellular terminal (FCT) 30 and the SGSN which validate the PDP context request. A node such as the SGSN 20 then checks the subscription of the fixed cellular terminal (FCT) 30; checks the quality of service (QoS), which affects the pricing of the service; sends information to the GGSN 19 as to how to reach the fixed cellular terminal (FCT) 30; and, configures a logical link to the GGSN 19 by setting up a tunnel. The GGSN 19 contacts a RADIUS or comparable server within the operator network and obtains an IP address for the fixed cellular terminal (FCT) 30, which IP address is sent to the fixed cellular terminal (FCT) 30.

Action 4-6 of FIG. 4 shows the TCP/IP program 156 opening a TCP socket. The air-interface packet-switched TCP socket logically connects the application on the local side, in the terminal equipment unit (TE) 50, with the corresponding application on the remote end (that can be located in a server or any other platform that supports the TCP/IP protocol). Both applications can then exchange their specific commands (SMTP, POP3, HTTP, etc.) over the open TCP socket.

Whenever there is data transfer (action 4-7) on the analog line 46, modem 121 in the FCT and modem 124 in the terminal equipment unit (TE) 50 provide layer 1 functionality (modulation/demodulation of digital data to adapt it to the analog line characteristics). The analog line handler 152 controls the FCT modem 121 according to the instructions it receives from control unit 151. The control unit 151 therefore synchronizes the GPRS unit 154 the possible actions that the analog line handler can produce on the analog line interface 120: off/on-hook, DTMF & pulse detection, tone generation, complete modem management, etc. All this layer 1 functionality has been omitted in FIG. 4, as it is common to the circuit-switched scenario.

After the actual TCP/IP packet transfer in the packet-service network is completed, either side can choose to end the communication. For example, if the end-user decides to go offline, the TCP/IP application in the terminal equipment (TE) 50 closes the TCP socket as action 4-8 (the FCT is transparent to this), and starts the PPP disconnection as action 4-9. During action 4-9, the FCT analog line handler 152 informs the control unit 151 that it should end the lower-layer communication. Subsequently, the control unit 151 commands the packet-service unit 154 to start actions 4-10 and 4-11. As in the activation steps 4-4 and 4-5, the completion of PPP disconnection 4-9 requires the completion of PDP context deactivation 4-10.

As action 4-10, packet-service unit 154 deactivates the PDP (Packet Data Protocol) context that had been activated as action 4-5. When this finishes, action 4-10 ends the PPP connection between the TE 50 and the FCT 30, started in action 4-4. As action 4-11, the GPRS unit 154 performs a packet-service detach procedure to remove the logical link between a node such as the SGSN node 20 and the fixed cellular terminal (FCT) 30 which had been created as action 4-3.

Figure 5:
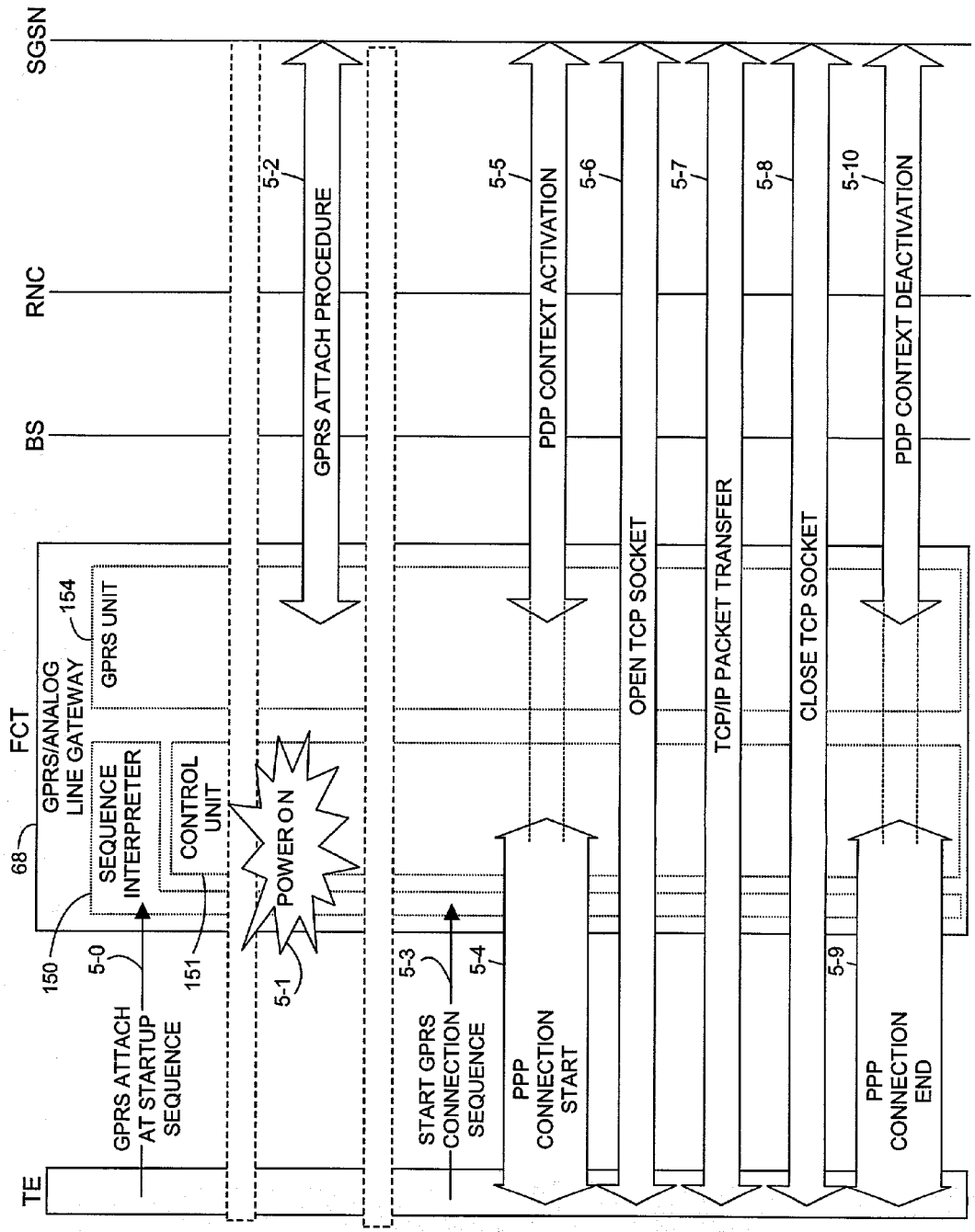

The GPRS network attach/detachment feature can work in many modes. In the example in FIG. 4, packet-service attach/detach is "on-call", taking place only when a packet-service call is setup up. Another working mode example is shown in FIG. 5, where the FCT attaches itself to the packet-service network automatically, i.e., whenever it initializes or resets (power on, etc), and remains attached until power off. The mode can be selected through a specific sequence sent by the terminal equipment (TE) unit 50 via the analog line interface 120, which is decoded by the sequence interpreter 150; also through AT commands, or other FCT-configuration methods.

FIG. 5 illustrates another scenario of the invention in which the operator at terminal equipment (TE) unit 50 dials yet another predetermined sequence of digits that signals to the fixed cellular terminal (FCT) 30 that the fixed cellular terminal (FCT) 30 is to automatically attach itself to the packet-switched network the next time that fixed cellular terminal (FCT) 30 is powered on. Transmission of this predetermined sequence of digits in the form of an automatic packet-service attach command (also known as a "switch to automatic mode" command) is shown as action 5-0 in FIG. 5. When the fixed cellular terminal (FCT) 30 next powers on (indicated by event 5-1), the packet-service unit 154 essentially immediately and automatically (without waiting for a further command from terminal equipment (TE) unit 50) commences the GPRS attach procedure 5-2. Later on in time, the starting of a packet-service communication will not require a previous packet-service attach action. All the actions that take place in the packet-service communication (5-3 to 5-10) are understood with reference to analogous actions 4-3 to 4-10 in FIG. 4.

In the sequence above described with reference to FIG. 5, should the terminal equipment (TE) unit 50 dial the predetermined sequence to switch to "on-call" mode, the packet-service unit 154 would run a packet-service detach sequence after PPP connection end as action 5-9, just as in FIG. 4. Also, if the fixed cellular terminal (FCT) 30 is powered off, and then subsequently be powered on, the automatic packet-service attach will not occur. Rather, registering in the packet-switched network will have to be performed manually by the user (predetermined sequence), or only on calls, using the start packet-service connection command in the manner of the mode of FIG. 4.

One aspect of the FCT herein provided is keeping control at the FCT of a current attach mode for performing an attachment to a packet-service. As illustrated above, one attach mode is the automatic attach mode. The automatic attach mode is designated as the current attach mode using the "switch to automatic mode" command. In the automatic attach mode, by default the radio unit attaches itself to the packet-switched cellular network on startup (e.g., power-up, reset, etc.).

Another attach mode is the on-calls mode. The on-calls attach mode is designated as the current attach mode using the "switch to on-calls mode" command. In the on-calls mode, by default, the radio unit does not attach itself to the at start up packet-switched cellular network on startup.

The modes illustrated herein have been generalized for packet services, with one specific case being GPRS. In all modes, the user could be offered the chance to manually attach/detach the FCT from the packet-service network. Another predetermined sequence of digits is utilized/recognized as a command for GPRS attach; and yet another predetermined sequence of digits is utilized/recognized as a command for packet-service detach. Upon detection of the packet-service attach command, the fixed cellular terminal (FCT) 30 sends the appropriate attach messages to the network. Upon detection of the detach command, the fixed cellular terminal (FCT) 30 sends the appropriate GPRS detach messages to the network.

The possibility of allowing the user to manually attach/detach the FCT could also be configurable, through a predetermined set of sequences to the sequence interpreter 150, or through AT commands or any other FCT-configuration method.

Whereas in scenarios such as FIG. 4 the packet-service attach procedure 4-3 is performed, it should be understood that a combined packet service/IMSI attach procedure could instead be performed to make fixed cellular terminal (FCT) 30 visible to both voice and packet data at the same time.

It will be appreciated that the functions of packet service/analog-line gateway 68 may be implemented using individual hardware circuits, using software functioning in conjunction with a suitably programmed digital microprocessor or general purpose computer, using an application specific integrated circuit (ASIC), and/or using one or more digital signal processors (DSPs).

In the present invention, control of the packet-service (e.g, GPRS) function is achieved by dialing specific sequences on the analog line interface 120. These sequences or commands are known by the fixed cellular terminal (FCT) 30 (e.g., sequence interpreter 150) and therefore not understood as B-numbers but instead as packet-service (e.g., GPRS) commands for accomplishing operations such as those above described. These sequences can be configured in the FCT by AT commands, or any other FCT-configuration method.

In accordance with the present invention, packet-switched data connections are available on the universally extended analog telephone line. The availability of the packet-switched services on the analog telephone line allows the operator to obtain a more efficient use of the spectrum. The end-user is able to maintain usage of his analog line, which is easy to configure and use, while enjoying the advantages of packet-switched services, e.g., proportionality between cost and data transfer. Therefore, the user need not pay strictly by connection time, which can be painful if the internet is slow, for example.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fixed cellular terminal (FCT) comprising:
a radio unit configured to facilitate radio frequency communication over an air interface with a cellular telecommunications network and which comprises a packet-switched unit configured to provide packet-switched services;
an analog line interface which is connected to the radio unit;
a packet-service/analog-line gateway configured to enable use of a packet-switched service provided by the packet-switched unit on the analog line interface;
wherein the packet-service/analog-line gateway comprises a sequence interpreter that is configured to perform a predetermined sequence of digits generated by a terminal equipment unit as a start packet-switched service command.

2. A fixed cellular terminal (FCT) comprising:
a radio unit configured to facilitate radio frequency communication over an air interface with a cellular telecommunications network and which comprises a packet-switched unit configured to provide packet-switched services;
an analog line interface which is connected to the radio unit;
a packet-service/analog-line gateway configured to enable use of a packet-switched service provided by the packet-switched unit on the analog line interface;
wherein the packet-service/analog-line gateway, upon receipt of a start packet-switched service command, is configured to attach the radio unit to the packet-switched cellular network if the radio unit has not previously attached, and it further configured to activate a Packet Data Protocol (PDP) context.

3. The apparatus of claim 2, wherein the analog line interface connects to a modem in a terminal equipment unit.

4. The apparatus of claim 2, wherein the packet-service/analog-line gateway is configured to implement a layer 2 point-to-point protocol that builds a link for packet transportation.

5. The apparatus of claim 4, wherein the analog line interface connects to a terminal equipment unit, and wherein by implementing the layer 2 protocol the packet-service/analog-line gateway allows the FCT to provide packet-switched connections through the analog interface without requiring any changes in the terminal equipment unit.

6. The apparatus of claim 2, wherein the analog line interface connects to a terminal equipment unit, and wherein the packet-service/analog-line gateway comprises a sequence interpreter configured to recognize a predetermined sequence of digits generated by a terminal equipment unit as packet-service attach command.

7. The apparatus of claim 2, wherein upon receipt of a packet-service network attach command, the packet-service/analog-line gateway is configured to perform an attach procedure of the radio unit to the packet-service cellular network.

8. The apparatus of claim 2, wherein the packet-service/analog-line gateway comprises a sequence interpreter configured to recognize a predetermined sequence of digits generated by a terminal equipment unit as packet-service network detach command.

9. The apparatus of claim 2, wherein upon receipt of a packet-service network detach command, the packet-service/analog-line gateway is configured to perform a detach procedure of the radio unit to the packet-service cellular network.

10. A fixed cellular terminal (FCT) comprising:
a radio unit configured to facilitate radio frequency communication over an air interface with a cellular telecommunications network and which comprises a packet-switched unit configured to provide packet-switched services;
an analog line interface which is connected to the radio unit;
a packet-service/analog-line gateway configured to enable use of a packet-switched service provided by the packet-switched unit on the analog line interface;
wherein the packet-service/analog-line gateway comprises a sequence interpreter configured to recognize a predetermined sequence of digits generated by a terminal equipment unit as a switch to automatic mode command.

11. A fixed cellular terminal (FCT) comprising:
a radio unit configured to facilitate radio frequency communication over an air interface with a cellular telecommunications network and which comprises a packet-switched unit configured to provide packet-switched services;

an analog line interface which is connected to the radio unit;

a packet-service/analog-line gateway configured to enable use of a packet-switched service provided by the packet-switched unit on the analog line interface;

wherein the analog line interface connects to a terminal equipment unit and wherein the packet-service/analog-line gateway is configured, upon receipt of a switch to automatic mode command, to attach the radio unit to the packet-switched cellular network if the radio unit has not previously attached, and is further configured to switch the terminal equipment to an automatic mode, wherein in the automatic mode by default the terminal equipment attaches itself at startup.

12. A fixed cellular terminal (FCT) comprising:

a radio unit configured to facilitate radio frequency communication over an air interface with a cellular telecommunications network and which comprises a packet-switched unit configured to provide packet-switched services;

an analog line interface which is connected to the radio unit;

a packet-service/analog-line gateway configured to enable use of a packet-switched service provided by the packet-switched unit on the analog line interface;

wherein the packet-service/analog-line gateway comprises a sequence interpreter configured to recognize a predetermined sequence of digits generated by a terminal equipment unit as a switch to on-call mode command.

13. A fixed cellular terminal (FCT) comprising:

a radio unit configured to facilitate radio frequency communication over an air interface with a cellular telecommunications network and which comprises a packet-switched unit configured to provide packet-switched services;

an analog line interface which is connected to the radio unit;

a packet-service/analog-line gateway configured to enable use of a packet-switched service provided by the packet-switched unit on the analog line interface;

wherein the analog line interface connects to a terminal equipment unit, and wherein the packet-service/analog-line gateway is configured, upon receipt of a switch to on-call mode command, to detach the radio unit from the packet-switched cellular network if the radio unit has not previously detached, and is configured to switch the terminal equipment to an on-call mode, wherein in the on-call mode by default the terminal equipment does not attach itself at startup.

14. For use in a fixed cellular terminal (FCT) which comprises a radio unit and an analog line interface which is connected to the radio unit, and a terminal unit externally connected to the FCT analog interface by a modem, a method comprising:

keeping control at the FCT of a current attach mode for performing an attachment to a packet-switched cellular network, at least one attach mode being one of an automatic attach mode and an on-call attach mode; and performing the attachment to the packet-switched cellular network in accordance with the current attach mode whereby a packet-switched service is provided on the analog line interface.

15. The method of claim 14, further comprising, upon startup of the fixed cellular terminal (FCT), performing the acts of:

attaching the radio unit to the packet-switched cellular network when the current attach mode is the automatic attach mode, not attaching the radio unit to the packet-switched cellular network when the current attach mode is the on-call attach mode.

16. For use in a fixed cellular terminal (FCT) which comprises a radio unit and an analog line interface which is connected to the radio unit, and a terminal unit externally connected to the FCT analog interface by a modem, a method comprising:

keeping control at the FCT of a current attach mode for performing an attachment to a packet-switched cellular network, at least one attach mode being one of an automatic attach mode and an on-call attach mode;

performing the attachment to the packet-switched cellular network in accordance with the current attach mode;

recognizing at the fixed cellular terminal (FCT) a predetermined sequence of digits generated by a terminal equipment unit as a packet-service attach command.

17. The method of claim 16, further comprising, upon receipt of the packet-service attach command, performing the act of:

attaching the radio unit to the packet-switched cellular network if the radio unit was not previously attached.

18. The method of claim 16, further comprising recognizing at the fixed cellular terminal (FCT) a predetermined sequence of digits generated by a terminal equipment unit as a packet-service detach command.

19. The method of claim 18, further comprising, upon receipt of the packet-service detach command, performing the act of:

detaching the radio unit from the packet-switched cellular network if the radio unit has not previously detached.

20. The method of claim 18, further comprising recognizing at the fixed cellular terminal (FCT) a predetermined sequence of digits generated by a terminal equipment unit as a switch to automatic mode command.

21. The method of claim 20, further comprising, upon receipt of the switch to automatic mode command, performing the act of:

attaching the radio unit to the packet-switched cellular network if the radio unit has not previously attached; and switching the equipment to the automatic mode.

22. The method of claim 20, further comprising recognizing at the fixed cellular terminal (FCT) a predetermined sequence of digits generated by a terminal equipment unit as a switch to on-calls mode command.

23. The method of claim 22, further comprising, upon receipt of the switch to on-calls mode command, performing the acts of:

detaching the radio unit from the packet-switched cellular network if the radio unit has not previously detached; and switching the equipment to the on-calls mode.

24. The method of claim 22, further comprising implementing in the fixed cellular terminal a layer 2 point-to-point (PPP) protocol on the packet-service/analog line gateway, for communication with an external modem and the terminal unit connected to the FCT analog interface.

25. The method of claim 24, further comprising recognizing at the fixed cellular terminal (FCT) a predetermined sequence of digits generated by a terminal equipment unit as a start packet-switched service command.

26. The method of claim 25, further comprising, upon receipt of the start packet-switched service command, performing the acts of:
- attaching the FCT to the packet-switched cellular network if the radio unit has not previously attached;
- activating a PPP layer on an analog line, between the packet-switched/analog line gateway and the modem and terminal unit connected to the analog line;
- activating PDP contexts on the radio packet-service;
- exchanging layer 2 information between an analog line layer 2 negotiation and an air-interface layer 2 negotiation; and
- allowing transparent transfer of layer 3 and above information between an application in the terminal unit and a corresponding node in the packet-switched cellular network.

27. The method of claim 26, further comprising, upon communication breakdown at an analog line, performing the acts of:
- deactivating the PPP layer on the analog line between the packet-switched/analog line gateway and the modem and terminal unit connected to the analog line,
- deactivating the PDP contexts on the radio packet-service;
- not detaching the FCT from the packet-switched cellular network when the current attach mode is the automatic mode;
- detaching the FCT from the packet-switched cellular network when the current attach mode is the on-call mode.

28. A fixed cellular terminal (FCT) comprising:
- a radio unit configured to facilitate radio frequency communication over an air interface with a cellular telecommunications network and which comprises a packet-switched unit configured to provide packet-switched services;
- an analog line interface which is connected to the radio unit;
- a packet-service/analog-line gateway configured to enable use of a packet-switched service provided by the packet-switched unit on the analog line interface;
- wherein the analog line interface connects to a terminal equipment unit, and wherein the packet-service/analog-line gateway comprises a sequence interpreter configured to recognize a predetermined sequence of digits generated by the terminal equipment unit as a packet-service command for controlling the packet-switched service;
- wherein the sequence interpreter is configured to recognize the predetermined sequence of digits generated by the terminal equipment unit as a start packet-service attach command for initiating a packet-service attach procedure.

29. The apparatus of claim 28, wherein the analog line interface is configured to connect to a modem in a terminal equipment unit.

30. The apparatus of claim 28, wherein the packet-service/analog-line gateway is configured to implement a layer 2 point-to-point protocol that builds a link for packet transportation.

31. The apparatus of claim 28, wherein the analog line interface is configured to connect to a terminal equipment unit, and wherein by implementing the layer 2 protocol the packet-service/analog-line gateway allows the FCT to provide packet-switched connections through the analog interface without requiring any changes in the terminal equipment unit.

32. A fixed cellular terminal (FCT) comprising:
- a radio unit configured to facilitate radio frequency communication over an air interface with a cellular telecommunications network and which comprises a packet-switched unit configured to provide packet-switched services;
- an analog line interface which is connected to the radio unit;
- a packet-service/analog-line gateway configured to enable use of a packet-switched service provided by the packet-switched unit on the analog line interface;
- wherein the analog line interface connects to a terminal equipment unit, and wherein the packet-service/analog-line gateway comprises a sequence interpreter configured to recognize a predetermined sequence of digits generated by the terminal equipment unit as a packet-service command for controlling the packet-switched service;
- wherein the sequence interpreter is configured to recognize the predetermined sequence of digits generated by the terminal equipment unit as a switch to automatic mode command for signaling that the fixed cellular terminal is to automatically attach itself to the packet-switched service a next time the cellular terminal is powered on.

33. A fixed cellular terminal (FCT) comprising:
- a radio unit configured to facilitate radio frequency communication over an air interface with a cellular telecommunications network and which comprises a packet-switched unit configured to provide packet-switched services;
- analog line interface which is connected to the radio unit;
- a packet-service/analog-line gateway configured to enable use of a packet-switched service provided by the packet-switched unit on the analog line interface;
- wherein the analog line interface connects to a terminal equipment unit, and wherein the packet-service/analog-line gateway comprises a sequence interpreter configured to recognize a predetermined sequence of digits generated by the terminal equipment unit as a packet-service command for controlling the packet-switched service;
- wherein the sequence interpreter is configured to recognize a predetermined sequence of digits generated by a terminal equipment unit as a switch to on-call mode command.

* * * * *

UNITED STATES PATENT AND TRADEMARK OFFICE
CERTIFICATE OF CORRECTION

PATENT NO. : 7,301,918 B2  
APPLICATION NO. : 10/124723  
DATED : November 27, 2007  
INVENTOR(S) : Echavarri et al.

Page 1 of 1

It is certified that error appears in the above-identified patent and that said Letters Patent is hereby corrected as shown below:

On the title page, item (57), under "ABSTRACT", in Column 2, Line 13, delete "(TB)" and insert -- (TE) --, therefor.

In the specification,

In Column 3, Line 42, delete "is" and insert -- is a --, therefor.

In Column 4, Line 37, delete "GRPS" and insert -- GPRS --, therefor.

In Column 4, Line 40, delete "GRPS" and insert -- GPRS --, therefor.

In Column 4, Line 52, delete "GRPS" and insert -- GPRS --, therefor.

In Column 5, Line 17, delete "URAN" and insert -- RAN --, therefor.

In Column 6, Line 51, delete "152;." and insert -- 152. --, therefor.

In Column 8, Line 50, delete "network" and insert -- network. --, therefor.

In the claims,

In Column 12, Line 10, in Claim 2, delete "it further" and insert -- it is further --, therefor.

Signed and Sealed this  
Sixteenth Day of February, 2016

Michelle K. Lee  
*Director of the United States Patent and Trademark Office*